United States Patent
Akatsu et al.

(10) Patent No.: US 9,975,317 B2
(45) Date of Patent: May 22, 2018

(54) COMPOSITE BODY OF METAL AND THERMOPLASTIC RESIN

(71) Applicant: Ube Industries, Ltd., Yamaguchi (JP)

(72) Inventors: Hiroki Akatsu, Yamaguchi (JP); Hideki Fujimura, Yamaguchi (JP); Riyousuke Sasaki, Yamaguchi (JP); Shinichi Hirayama, Yamaguchi (JP); Tetsurou Hiroki, Yamaguchi (JP); Hideki Harada, Yamaguchi (JP)

(73) Assignee: Ube Industries, Ltd., Ube-shi (JP)

( * ) Notice: Subject to any disclaimer, the term of this patent is extended or adjusted under 35 U.S.C. 154(b) by 157 days.

(21) Appl. No.: 14/911,569

(22) PCT Filed: Aug. 12, 2014

(86) PCT No.: PCT/JP2014/071276
§ 371 (c)(1),
(2) Date: Feb. 11, 2016

(87) PCT Pub. No.: WO2015/022955
PCT Pub. Date: Feb. 19, 2015

(65) Prior Publication Data
US 2016/0185088 A1    Jun. 30, 2016

(30) Foreign Application Priority Data

Aug. 12, 2013 (JP) .................. 2013-167454
Feb. 12, 2014 (JP) .................. 2014-024218

(51) Int. Cl.
*B32B 27/20* (2006.01)
*B32B 15/088* (2006.01)
(Continued)

(52) U.S. Cl.
CPC .......... *B32B 27/20* (2013.01); *B29C 45/0001* (2013.01); *B29C 45/14311* (2013.01);
(Continued)

(58) Field of Classification Search
CPC ....... B32B 15/088; B32B 15/06; B32B 27/20; B32B 27/34; B32B 2377/00
(Continued)

(56) References Cited

U.S. PATENT DOCUMENTS

2009/0274889 A1* 11/2009 Iwahashi ........... B29C 45/14311
428/312.8
2009/0274913 A1* 11/2009 Okushita ................. B32B 27/08
428/423.5
2011/0015324 A1* 1/2011 Hara .......................... C08J 5/18
524/381

FOREIGN PATENT DOCUMENTS

EP    2270098 A1    1/2011
JP    52146446 A    12/1977
(Continued)

*Primary Examiner* — Fred M Teskin
(74) *Attorney, Agent, or Firm* — The Webb Law Firm

(57) ABSTRACT

Provided is a composite body in which a resin and a metal are contact-bonded with excellent adhesive force. Also provided is a composite body which is suppressed in decrease of bonding strength between a resin and a metal due to water absorption of the resin even if the composite body is left in rain or water, or is left in a high humidity environment or the like for a long period of time. The present invention relates to a composite body which is obtained by contact-bonding a thermoplastic resin (A) and a metal (B), and which is characterized in that the thermoplastic resin (A) is a polyamide elastomer (1A) or a thermoplastic resin composition (2A) that contains a water absorbent thermoplastic resin (2a) and a metal hydroxide (2b).

9 Claims, 1 Drawing Sheet

(51) Int. Cl.
  *B29C 45/14* (2006.01)
  *B29C 45/00* (2006.01)
  *B32B 15/06* (2006.01)
  *B32B 15/08* (2006.01)
  *B32B 27/18* (2006.01)
  *B32B 27/34* (2006.01)
  *B32B 27/36* (2006.01)
  *B32B 27/28* (2006.01)
  *C08G 73/02* (2006.01)
  *B29K 77/00* (2006.01)
  *B29K 105/00* (2006.01)
  *B29K 105/16* (2006.01)
  *B29K 509/08* (2006.01)
  *B29K 705/02* (2006.01)

(52) U.S. Cl.
  CPC .............. *B32B 15/06* (2013.01); *B32B 15/08* (2013.01); *B32B 15/088* (2013.01); *B32B 27/18* (2013.01); *B32B 27/285* (2013.01); *B32B 27/34* (2013.01); *B32B 27/36* (2013.01); B29K 2077/00 (2013.01); B29K 2105/0005 (2013.01); B29K 2105/16 (2013.01); B29K 2509/08 (2013.01); B29K 2705/02 (2013.01); B32B 2262/101 (2013.01); B32B 2264/102 (2013.01); B32B 2264/104 (2013.01); *B32B 2264/108* (2013.01); *B32B 2274/00* (2013.01); *B32B 2307/202* (2013.01); *B32B 2307/302* (2013.01); *B32B 2307/306* (2013.01); *B32B 2307/54* (2013.01); *B32B 2307/558* (2013.01); *B32B 2307/728* (2013.01); *B32B 2307/7242* (2013.01); *B32B 2307/7265* (2013.01); *B32B 2307/734* (2013.01); *B32B 2605/08* (2013.01)

(58) Field of Classification Search
  USPC ........................................................ 428/458
  See application file for complete search history.

(56) References Cited

FOREIGN PATENT DOCUMENTS

| | | |
|---|---|---|
| JP | 6274644 A | 4/1987 |
| JP | 551671 B2 | 12/1990 |
| JP | 9241865 A | 9/1997 |
| JP | 3967104 B2 | 4/2003 |
| JP | 2003286341 A | 10/2003 |
| JP | 200410830 A | 1/2004 |
| JP | 2004352791 A | 12/2004 |
| JP | 2004352796 A | 12/2004 |
| JP | 4541153 B2 | 7/2010 |
| WO | 2012132639 A1 | 10/2012 |

* cited by examiner

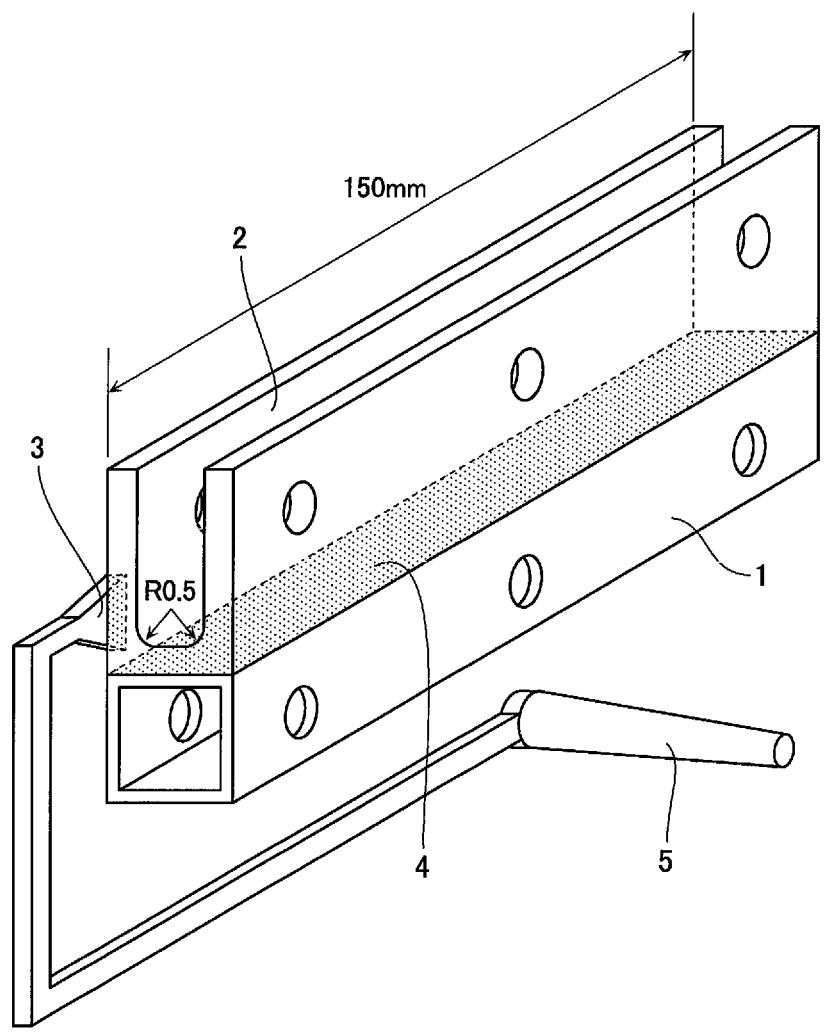

COMPOSITE BODY OF METAL AND THERMOPLASTIC RESIN

CROSS-REFERENCE TO RELATED APPLICATIONS

This application is the United States national phase of International Application No. PCT/JP2014/071276 filed Aug. 12, 2014, and claims priority to Japanese Patent Application Nos. 2013-167454 and 2014-024218 filed Aug. 12, 2013, and Feb. 12, 2014, respectively, the disclosures of which are hereby incorporated in their entirety by reference.

TECHNICAL FIELD

The present invention relates to a composite body of metal and thermoplastic resin which are contact-bonded with each other.

BACKGROUND ART

In a wide range of fields, such as automotive, electrical/electronic, and the like, engineering plastics, in which constituent materials of components that had previously been made of metal materials, are replaced by resin materials and have contributed to lighter weight and lower cost of the components. However, since components made of resin materials alone as the constituent material have insufficient strength and rigidity at high temperatures, inadequate resistance to specific chemical substances, and the like, replacement of metal with resin materials is reaching a limit. Moreover, it has been attempted to improve surface texture, corrosion preventive function, and the like in components made of metal materials alone, through compositing or through multi-layering with resin materials. However, these attempts may bring about deficient strength of the component as a whole due to poor bonding of metal and resin, or diminished functionality of the component due to infiltration or accumulation of liquid in the joined portions of the metal and the resin in cases of components that come into contact with liquids.

In these circumstances, there exists a need for a technique for secure bonding of metals and resins, and a number of methods have been proposed. For example, Patent Document 1 discloses a composite body obtained by contact-bonding a thermoplastic resin composition (A) containing a thermoplastic resin and an inorganic filler that increases the crystallization temperature of the thermoplastic resin by 3° C. or more, and a surface-treated metal (B).

Further, Patent Documents 2 to 4 disclose and propose techniques of performing specific treatments on the metal so as to bond the resin and the metal with each other.

PRIOR ART DOCUMENTS

Patent Documents

Patent Document 1: WO 2012/132639 A

Patent Document 2: Japanese Patent No. 3967104

Patent Document 3: Japanese Patent No. 4541153

Patent Document 4: Japanese Laid-Open Patent Application No. 5-51671

DISCLOSURE OF THE INVENTION

Problems to be Solved by the Invention

However, it is difficult to bond the thermoplastic resin composition described in Patent Document 1 alone with the metal only, and there is room for improvement in the bonding strength.

Furthermore, in the case of a water-absorbing resin such as Nylon, even if the composite body of the resin and the metal is produced by injection molding, or the like to firmly bond the resin with the metal, where the composite body is left stand in the rain or in the water, or exposed to high humidity, the bonding strength between the resin and the metal is lowered due to water absorption of the resin. As a result, there are cases where the resin is easily peeled from the metal. Since there is water or steam in a use atmosphere in any application fields, it becomes necessary to take measures of preventing lowering of the bonding strength between the resin and the metal in order to improve reliability of the composite body of the resin and the metal.

The present invention has been accomplished with the consideration to the above problems. It is an object of the present invention to provide a composite body in which a resin and a metal are bonded with an excellent bonding strength.

Further, it is an object of the present invention to provide a composite body in which even if it is left stand in the rain or in the water, or exposed to high humidity for a long time, lowering of the bonding strength between the resin and the metal due to water absorption of the resin is suppressed.

Means to Solve the Problems

In order to attain the objects described above, the present inventors have intensively researched; as a result, they have found that when a polyamide elastomer is used as a resin, it is possible to obtain a composite body in which the resin and a metal are bonded with an excellent bonding strength.

Further, the present inventors have found that where a thermoplastic resin composition containing a water absorbent thermoplastic resin and a metal hydroxide is bonded with a metal to form a composite body, lowering of the bonding strength between the resin and the metal is suppressed, and have reached the present invention.

According to the present invention, there is provided a composite body obtained by contact-bonding a thermoplastic resin (A) and a metal (B), wherein the thermoplastic resin (A) is a polyamide elastomer (1A) or a thermoplastic resin composition (2A) containing a water absorbent thermoplastic resin (2a) and a metal hydroxide (2b).

Advantageous Effects of the Invention

As described above, according to the present invention, there can be provided a composite body in which a resin and a metal are bonded with an excellent bonding strength.

Further, there can be provided a composite body in which even if it is left stand in the rain or in the water, or exposed to high humidity for a long time, lowering of the bonding strength between the resin and the metal due to water absorption of the resin is suppressed.

BRIEF DESCRIPTION OF THE DRAWING

The FIGURE is a view showing the composite body used in Experimental Example 3.

BEST MODE FOR CARRYING OUT THE INVENTION (The Case where a Thermoplastic Resin (A) is a Polyamide Elastomer (1A))

First of all, there will be described the case where a thermoplastic resin (A) is a polyamide elastomer (1A) as shown below.

[Polyamide Elastomer (1A)]

In the composite body of the present invention, either a polyamide elastomer (1a) singly or a polyamide elastomer composition containing a polyamide elastomer (1a) and an inorganic filler (1b) can be suitably used as a polyamide elastomer (1A).

[Polyamide Elastomer (1a)]

A polyamide elastomer having a polyamide unit as a hard segment and a polyether unit as a soft unit is preferably used as a polyamide elastomer (1a). For example, the preferred polyamide elastomer (1a) includes a polyether ester amide elastomer in which the hard segment and the soft segment are bonded with each other by means of an ester bond, and a polyether amide elastomer in which the hard segment and the soft segment are bonded with each other by means of an amide bond.

The hard segment is a polyamide having a carboxyl group at each end, and contains a polyamide forming unit and at least one dicaboxylic acid selected from the group consisting of aliphatic dicaboxylic acid, alicyclic dicaboxylic acid, and aromatic dicaboxylic acid.

The polyamide forming unit of the hard segment is a unit including lactam, aminocaboxylic acid and/or Nylon salt consisting of diamine and dicaboxylic acid. It includes a unit obtained by reacting at least one or two of lactam, aminocaboxylic acid and Nylon salt consisting of diamine and dicaboxylic acid.

Lactam includes aliphatic lactam having a carbon number of 5 to 20, such as ε-caprolactam, ω-enantholactam, ω-undecalactam, ω-lauryllactam, and 2-pirrolidone.

Aminocaboxylic acid includes aliphatic ω-aminocaboxylic acid having a carbon number of 5 to 20, such as 6-aminocaproic acid, 7-aminoheptanoic acid, 8-aminooctoic acid, 10-aminocapric acid, 11-aminoundecanoic acid, and 12-aminododecanoic acid.

Diamine used in the Nylon salt consisting of diamine and dicaboxylic acid includes a diamine compound such as aliphatic diamine having a carbon number of 2 to 20, for example, ethylene diamine, trimethylene diamine, tetramethylene diamine, hexamethylene diamine, heptamethylene diamine, octamethylene, nonamethylene diamine, decamethylene diamine, undecamethylene diamine, dodecamethylene diamine, 2,2,4-trimethylhexamethylene diamine, 2,4,4-trimethylhexamethylene diamine, and 3-methylpentamethylene diamine. Dicaboxylic acid includes a dicaboxylic acid compound such as aliphatic dicaboxylic acid having a carbon number of 2 to 20, for example, oxalic acid, succinic acid, glutaric acid, adipic acid, pimelic acid, suberic acid, azelaic acid, sebacic acid, and dodecanoic diacid.

Of these compounds, in particular, ω-lauryllactam, 11-aminoundecanoic acid, and 12-aminododecanoic acid are preferable in view of a dimension stability due to low water absorbance, a chemical resistance, and mechanical characteristics.

Dicaboxylic acid of the hard segment can be used as a molecular weight modifier. As specific examples of dicaboxylic acid, there may be cited aliphatic dicaboxylic acid including straight-chain dicaboxylic acid having a carbon number of 2 to 25 such as oxalic acid, succinic acid, glutaric acid, adipic acid, pimelic acid, suberic acid, azelaic acid, sebacic acid, and dodecanoic diacid; dimerized aliphatic dicaboxylic acid (dimer acid) having a carbon number of 14 to 48 and obtained by dimerizing unsaturated aliphatic acid obtained by fractional-distillating triglyceride, hydrogenated compound thereof (hydrogenated dimer acid), or the like; alicyclic dicaboxylic acid such as 1,4-cyclohexane dicaboxylic acid; and aromatic dicaboxylic acid such as terephthalic acid and isophthalic acid. Pripol 1004, Pripol 1006, Pripol 1009 and Pripol 1023 (tradename; manufactured by Uniqema Inc.), or the like can be used as dimer acid and hydrogenated dimer acid.

Polyamide having a carboxyl group at each end can be obtained by ring-opening-polymerizing or condensation-polymerizing the above-described polyamide forming unit in the presence of the dicaboxylic acid by conventional means.

The number-average molecular weight of the hard segment ranges preferably 300 to 15,000, more preferably 300 to 6,000 in view of flexibility and moldability.

On the other hand, as the soft segment, polyether is preferably used. The polyether includes polyethylene glycol, polypropylene glycol, polytetramethylene ether glycol, ABA type triblock polyether represented by formula (1) shown below, or the like. These may be used singly, or two or more types used together. Further, there can be used polyether diamine or the like, to be obtained by reacting the end of polyether with ammonia or the like. The number-average molecular weight of the soft segment ranges preferably 200 to 6,000, more preferably 650 to 2,000.

[Formula 1]

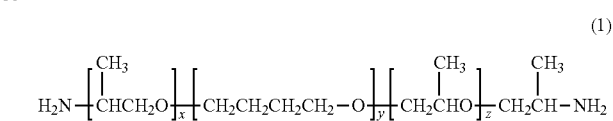

(1)

(In the formula, x denotes 1 to 20, y denotes 4 to 50, and z denotes 1 to 20.)

In Formula (1) described above, x and z denote, respectively, an integer of 1 to 20, preferably, 1 to 18, more preferably, 1 to 16, particularly preferably, 1 to 14, most preferably, 1 to 12. y denotes an integer of 4 to 50, preferably, 5 to 45, more preferably, 6 to 40, particularly preferably, 7 to 35, most preferably, 8 to 30.

As the combination of the hard segment and the soft segment, there can be cited the combination of the hard segment and soft segment described above. The preferable combination is a combination of an open ring polymer or condensate of lauryl lactam and polyethylene glycol, a combination of an open ring polymer or condensate of lauryl lactam and polypropylene glycol, a combination of an open ring polymer or condensate of lauryl lactam and polytetramethylene ether glycol, and a combination of an open ring polymer or condensate of lauryl lactam and ABA type triblock polyether. The particularly preferable combination is a combination of an open ring polymer or condensate of lauryl lactam and ABA type triblock polyether.

A ratio (weight ratio) of the hard segment to the soft segment ranges preferably 95/5 to 20/80 (the hard segment/the soft segment), more preferably 90/10 to 30/70, particularly preferably 80/20 to 40/60. When the amount of the hard segment is less than 20 weight %, breed-out easily occurs in the molded body and the molded body may not be used as a product. When the amount of the hard segment exceeds 95 weight %, the flexibility of the molded body tends to be insufficient.

The commercial product of the polyamide elastomer described above includes DAIAMID produced by Daicel-Evonic Ltd., Pebax produced by ARKEMA Co., Grilamid produced by EMS-CHEMIE Japan Ltd., HYPER ALLOY ACTYMER produced by RIKEN TECHNOS Co., Novamid produced by Mitsubishi Engineer Plastics Co., series of UBESTA XPA produced by Ube Industries, Ltd.

Of these products, there can be preferably used polyether amide elastomer such as UBESTA XPA 9040X1, UBESTA XPA 9040F1, UBESTA XPA 9048X1, UBESTA XPA 9048F1, UBESTA XPA 9055X1, UBESTA XPA 9055F1, UBESTA XPA 9063X1, UBESTA XPA 9063F1, UBESTA XPA 9068X1, UBESTA XPA 9068F1, UBESTA XPA 9040X2, UBESTA XPA 9048X2, UBESTA XPA 9040F2, UBESTA XPA 9048F2, UBESTA XPA 9035X, or the like, produced by Ube Industries, Ltd.

[Inorganic Filler (1b)]

As the inorganic filler (1b), at least one selected from the group consisting of silicate mineral, hydroxide, graphite, and metal oxide is preferred.

The silicate mineral includes talc, Wollastonite, mica, clay, or the like. The hydroxide includes aluminum hydroxide, magnesium hydroxide, or the like. The metal oxide includes titanium oxide, iron oxide, zinc oxide, magnesium oxide, or the like. Of these, at least one selected from the group consisting of talc, magnesium hydroxide, graphite, and magnesium oxide is preferred.

The compounding amount of the inorganic filler (1b) is preferably 0.01 weight % to 50 weight % of the polyamide elastomer composition, and from the standpoint of bonding strength, preferably 0.05 weight % to 20 weight %, more preferably 5 weight % to 20 weight %. Depending on the type of polyamide elastomer, the type of metal, and the surface treatment method thereof, a state of adequate bonding may be obtained even at 0.01 weight %, and it is therefore desirable to select the compounding amount in a manner dependent on the application of the composite.

There are no particular limitations as to the mean particle size of the inorganic filler (1b), but inconsideration of the appearance and impact strength of the molded article, 20 μm or smaller is preferable, while from the standpoint of bonding to metal, 2 to 15 μm is preferred. The mean particle size is measured by sampling the inorganic filler in accordance with, for example, Powder mass mixtures—general rules for methods of sampling (JIS M8100) specified in Japanese Industrial Standards; preparing the inorganic filler as a sample for measurement in accordance with General rules for sample preparation for particle size analysis of fine ceramic raw powders (JIS R1622-1995); and measuring in accordance with Determination of particle size distribution of fine ceramic raw powders by laser diffraction method (JIS R 1629-1997). A SALD-7000 laser diffraction type particle size distribution measurement device, made by Shimadzu Corp., or the like, can be used as the device.

The inorganic filler may be subjected to a coupling treatment in order to improve cohesion to the resin, to thereby enhance the mechanical properties and molded appearance. As a coupling agent, an epoxy silane coupling agent, an amino silane coupling agent and the like may be cited. The addition amount of the coupling agent can be from 0.01 to 5 weight parts per 100 weight parts of the inorganic filler. It can be preferably from 0.01 to 1.0 weight % of the polyamide elastomer composition.

In addition to the inorganic filler (1b), the polyamide elastomer (1A) may contain a customarily compounded additive, a modifier, and a reinforcing agent of various types, in amounts such that the characteristics of the composite body of the present invention are not diminished. It includes, for example, a thermal stabilizer, an antioxidant, a UV absorber, a weathering agent, another filler, a plasticizer, a blowing agent, an anti-blocking agent, a tackifying agent, a sealing improver, an antifogging agent, a release agent, a crosslinking agent, a blowing agent, a flame retardant, a coloring agent (a pigment, a dye, and the like), a coupling agent, an inorganic reinforcing material such as a glass fiber, and the like. There are no particular limitations as to the method for compounding various additives into the polyamide elastomer, and there may be cited typical methods such as dry-blending methods employing a tumbler or mixer; a method of melt-kneading employing a single-screw or twin-screw extruder in advance at the concentration to be used during molding; a masterbatch method involving incorporation into the starting material employing a single-screw or twin-screw extruder in advance at high concentration, followed by dilution for use at the time of molding, or the like.

[Metal (B)]

In the composite body of the present invention, any one of surface-treated metal and surface-untreated metal may be preferably used as metal (B) of (B) component. There are no particular limitations as to the metal (B). It includes, for example, iron, copper, silver, gold, aluminum, zinc, lead, tin, magnesium, and alloys thereof (stainless steel, brass, phosphor bronze, and the like). Thin film metal or coating of metal (metal plating, a deposited film, a coating film, or the like) may be targeted as well.

In case of surface-treated metal, surface treatment includes, for example, treatment by immersion of the metal surface in an erosive liquid, anodic oxidation to bring about a state in which microscopic asperities are produced on the metal surface, and treatment by fixing a chemical substance to the metal surface.

In the method of treatment by immersion of the metal surface in an erosive liquid, water soluble amine compounds can be cited as erosive liquids. The water soluble amine compound includes ammonia, hydrazine, methylamine, dimethylamine, trimethylamine, ethylamine, diethyl amine, triethyl amine, ethylene diamine, allylamine, ethanolamine, diethanol amine, triethanol amine, aniline, and other amines. Of these, hydrazine is particularly preferred, due to its minimal odor and effectiveness at low concentration.

In the method of anodic oxidation, anodic oxidation refers to forming an oxide film on a metal surface when electrical current passes through the metal used as an anode, in an electrolyte solution. The aforementioned water soluble amine compound may be cited as an electrolyte, for example.

The state in which microscopic asperities are produced on the metal surface is preferably one in which the metal surface, when measured by observation with an electron microscope, is covered by microscopic recesses or hole openings of number-average diameter of 10 to 100 nm, preferably 10 to 80 nm.

A triazine dithiol derivative may be cited as a chemical substance for fixing to the metal surface. The triazine dithiol derivative is preferably one represented by the following general formula (2).

[Formula 2]

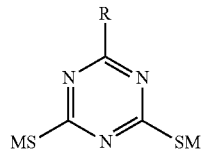

(2)

(in formula (2), R denots —OR$_1$, —OOR$_1$, —SmR$_1$, —NR$_1$(R$_2$); R$_1$ and R$_2$ denote H, a hydroxyl group, a carbonyl group, an ether group, an ester group, an amide group, an amino group, a phenyl group, a cycloalkyl group, an alkyl group, or a substituent group including an unsaturated group such as an alkyne or alkane, m is an integer from 1 to 8, and M denotes H, or an alkali such as Na, Li, K, Ba, Ca, and an ammonium salt).

As specific examples of triazine dithiol derivatives of the aforementioned formula (2), there may be cited 1,3,5-triazine-2,4,6-trithiol, 1,3,5-triazine-2,4,6-trithiol monosodium, 1,3,5-triazine-2,4,6-trithiol triethanol amine, 6-anilino-1,3,5-triazine-2,4-dithiol, 6-anilino-1,3,5-triazine-2,4-dithiol monosodium, 6-dibutylamino-1,3,5-triazine-2,4-dithiol, 6-dibutylamino-1,3,5-triazine-2,4-dithiol monosodium, 6-diallylamino-1,3,5-triazine-2,4-dithiol, 6-diallylamino-1,3,5-triazine-2,4-dithiol monosodium, 1,3,5-triazine-2,4,6-trithiol ditetrabutyl ammonium salt, 6-dibutylamino-1,3,5-triazine-2,4-dithiol tetrabutyl ammonium salt, 6-dioctylamino-1,3,5-triazine-2,4-dithiol, 6-dioctylamino-1,3,5-triazine-2,4-dithiol monosodium, 6-dilaurylamino-1,3,5-triazine-2,4-dithiol, 6-dilaurylamino-1,3,5-triazine-2,4-dithiol monosodium, 6-stearylamino-1,3,5-triazine-2,4-dithiol, 6-stearylamino-1,3,5-triazine-2,4-dithiol monopotassium, 6-oleylamino-1,3,5-triazine-2,4-dithiol, 6-oleylamino-1,3,5-triazine-2,4-dithiol monopotassium, or the like.

As the method for fixing the chemical substance to a metal surface, there can be cited a method employing an aqueous solution of the chemical substance, or a solution thereof in a medium of an organic solvent, such as methyl alcohol, isopropyl alcohol, ethyl alcohol, acetone, toluene, ethyl cellosolve, dimethyl formaldehyde, tetrahydrofuran, methyl ethyl ketone, benzene, acetic acid ethyl ether, or the like, in which the metal is deployed as the anode, and a platinum plate, titanium plate or carbon plate as the cathode, and an electric current of 0.1 mA/dm$^2$ to 10 A/dm$^2$ at 20 V or below is passed therethrough for 0.1 second to 10 minutes at 0-80° C.

The surface-treated metal is preferably a metal in which the metal surface is covered by recesses or hole openings of number-average diameter of 10 to 100 nm as measured by electron microscope observation, or a metal to which a triazine thiol derivative is fixed.

[Composite Body (1A-B)]

In the present invention, there are no particular limitations as to the method for contact bonding of the polyimide elastomer (1A) and the metal (B), but contact bonding is performed by, for example, injection molding. For example, a composite body (1A-B) in which the polyimide elastomer (1A) and the metal (B) are bonded may be obtained by arranging the metal (B) on one die, closing the die, introducing the polyimide elastomer (1A) into the injection molding machine from the hopper of the injection molding machine, and injecting the molten resin into the die, then opening and parting the moveable die. In general, a thermoplastic resin and metal do not express adhesive properties in an injection molding. The present invention is characterized in that the polyimide elastomer (1A) and the metal (B) express adhesive properties in an injection molding.

The conditions for injection molding will differ depending on the type of polyimide elastomer (1A), and there are no particular limitations, but the die temperature is preferably from 10° C. to 120° C. Generally, from the standpoint of product qualities such as strength, and of the molding cycle, from 40° C. to 90° C. is more preferred, with 60° C. or above being still more preferred, for injection molding to bond to the metal.

In the manufacturing process of composite body (1A-B), since it is possible to employ a conventional injection molding or to melt-bond molded resin and metal after injection molding, an adhesive coating process or the like is unnecessary. Due to this, freedom of article design is secured and process cost can be economized.

Further, the polyimide elastomer (1A) and the metal (B) can be contact-bonded also by hot pressing. The temperature condition of hot pressing is preferably melting point of resin plus 25° C.

Further, the polyimide elastomer (1A) and the metal (B) can be contact-bonded also by an extrusion molding based on a conventional procedure. In this case, it can be applied to a product having overall shape of preferably a tube or rod with a uniform cross section, such as cylindrical or the like, and having a multilayer configuration of resin and metal.

In the composite body (1A-B) of the present invention, the elastomer and the metal is sufficiently bonded without using an adhesive agent. Specifically, the composite body (1A-B) exhibits as high as at least 50 of a ratio of a high bonding strength to a tensile elastic modulus (bonding strength$^2$/tensile elastic modulus×100) measured by the test procedure employed in EXAMPLE described later.

Therefore, the composite body (1A-B) of the present invention can be applied to a wide variety of uses, such as automotive components including seatbelt, intake manifold, cylinder head cover, canister, engine cover, or the like; electrical/electronic components; general mechanical components; sheets; tape; pipes; tubes; plastic magnets; and tire members. In particular, the composite body is suitable for use in applications in which heat resistance, resistance properties, minimal gas/liquid permeability, dimensional/shape stability, electrical conductivity, heat conductivity, and strength are required concomitantly, such as in automotive fuel components, for example.

(The Case where a Thermoplastic Resin (A) is a Thermoplastic Resin Composition (2A))

Next, there will be described the case where a thermoplastic resin (A) is a thermoplastic resin composition (2A) containing a thermoplastic resin (2a) having a water-absorbing property and metal hydroxide (2b).

[Thermoplastic Resin Composition (2a)]

The present invention improves poor bonding properties such as a bonding strength of the bonded structure caused by water absorbing which is due to a water-absorbing property of the thermoplastic resin. Accordingly, the thermoplastic resin to be an object has a water-absorbing property. That is, the thermoplastic resin composition (2A) contains a thermoplastic resin (2a) having a water-absorbing property and metal hydroxide (2b).

[Thermoplastic Resin (2a) Having a Water-Absorbing Property]

The thermoplastic resin (2a) having a water-absorbing property includes polyester resin, polyether resin, polynitrile resin, polymethacrylate resin, polycarbonate resin (PC), polyamide resin, or the like. One, or two or more of these can be used. Of these, polyester resin and/or polyamide resin is preferred since they have a high water absorbing property or a tendency of hydrolyzing due to water absorbing.

The polyester resin includes polybutylene terephthalate (PBT), polyethylene terephthalate (PET), polytrimethylene terephthalate (PTT), polyethylene isophthalate (PEI), PET/PEI copolymer, polybutylene naphthalate (PBN), polyethylene naphthalate (PEN), polylactic acid (PLA), polyglycolic acid (PGA), polyester elastomer, or the like. These may be used singly, or two or more types used together.

The polyether resin includes polyacetal (POM), polyphenylene oxide (PPO), or the like. These may be used singly, or two or more types used together.

The polynitrile resin includes polyacrylonitrile (PAN), polymethacrylonitrile, acrylonitrile/styrene copolymer (AS), methacrylonitrile/styrene copolymer, acrylonitrile/butadiene/styrene copolymer (ABS), methacrylonitrile/styrene/butadiene copolymer (MBS), or the like. These may be used singly, or two or more types used together.

The polymethacrylate resin includes polymethyl methacrylate (PMMA), polyethylmethacrylate (PEMA), or the like. These may be used singly, or two or more types used together.

The polyamide resin includes, for example, polycaprolactam (polyamide 6), polyundecalactam (polyamide 11), polydodecalactam (polyamide 12), polyethylene adipamide (polyamide 26), polytetramethylene adipamide (polyamide 46), polyhexamethylene adipamide (polyamide 66), polyhexamethylene azelamide (polyamide 69), polyhexamethylene sebacamide (polyamide 610), polyhexamethylene undecamide (polyamide 611), polyhexamethylene dodecamide (polyamide 612), polyhexamethylene terephthalamide (polyamide 6T), polyhexamethylene isophthalamide (polyamide 6I), polyhexamethylene hexahydroterephthalamide (polyamide 6T(H)), polynonamethylene adipamide (polyamide 96), polynonamethylene azelamide (polyamide 99), polynonamethylene sebacamide (polyamide 910), polynonamethylene dodecamide (polyamide 912), polynonamethylene terephthalamide (polyamide 9T), polytrimethylhexamethylene terephthalamide (polyamide TMHT), polynonamethylene hexahydroterephthalamide (polyamide 9T(H)), polynonamethylene naphthalamide (polyamide 9N), polydecamethylene adipamide (polyamide 106), polydecamethylene azelamide (polyamide 109), polydecamethylene decamide (polyamide 1010), polydecamethylene dodecamide (polyamide 1012), polydecamethylene terephthalamide (polyamide 10T), polydecamethylene hexahydroterephthalamide (polyamide 10T(H)), polydecamethylene naphthalamide (polyamide 10N), polydodecamethylene adipamide (polyamide 126), polydodecamethylene azelamide (polyamide 129), polydodecamethylene sebacamide (polyamide 1210), polydodecamethylene dodecamide (polyamide 1212), polydodecamethylene terephthalamide (polyamide 12T), polydodecamethylene hexahydroterephthalamide (polyamide 12T(H)), polydodecamethylene naphthalamide (polyamide 12N), polymetaxylylene adipamide (polyamide MXD6), polymetaxylylene suberamide (polyamide MXD8), polymetaxylylene azelamide (polyamide MXD9), polymetaxylylene sebacamide (polyamide MXD10), polymetaxylylene dodecamide (polyamide MXD12), polymetaxylylene terephthalamide (polyamide MXDT), polymetaxylylene isophthalamide (polyamide MXDI), polymetaxylylene naphthalamide (polyamide MXDN), polybis(4-aminocyclohexyl)methane dodecamide (polyamide PACM12), polybis(4-aminocyclohexyl)methane terephthalamide (polyamide PACMT), polybis(4-aminocyclohexyl)methane isophthalamide (polyamide PACMI), polybis(3-methyl-4-aminocyclohexyl)methane dodecamide (polyamide dimethyl PACM12), polyisophorone adipamide (polyamide IPD6), polyisophorone terephthalamide (polyamide IPDT), and polyamide copolymers or polyamide elastomer of these.

Of these, from the standpoint of a balance between material functionality, such as mechanical characteristics and chemical resistance, on the one hand, and price on the other, polyamide 6, polyamide 12, polyamide 66, polyamide 6/66 copolymer (copolymer of polyamide 6 and polyamide 66; copolymers are denoted in the same fashion hereinbelow), polyamide 6/12 copolymer, or polyamide 6/66/12 copolymer is preferred, and polyamide 6 and/or polyamide 66 being especially preferred, from the standpoint of moldability, mechanical characteristics, and durability. These may be used singly, or two or more types used together.

There are no particular limitations as to the type of terminal groups of the polyamide resin, or the concentration or molecular weight distribution thereof. In order to adjust the molecular weight, or stabilize melting during the molding process, there may be added one, or two or more, molecular weight adjusters selected from monocarboxylic acids such as acetic acid, stearic acid, and the like, diamines such as meta-xylylene diamine, isophorone diamine, and the like, monoamines, and dicarboxylic acids, as appropriate.

When measured according to the viscosity measurement method of JIS K-6920 in 96 weight % sulfuric acid, at a polymer concentration of 1 weight %, at a temperature of 25° C., the relative viscosity of the polyamide resin is preferably from 1.0 to 5.0, more preferably from 1.5 to 4.5, and still preferably from 1.8 to 4.0, from the standpoint of the mechanical characteristics and moldability of the polyamide resin obtained.

There is no particular limitation as to the amount of aqueous extraction of the polyamide resin, as measured in accordance with the method for measuring the low-molecular weight content specified in JIS K-6920, but it is preferably 5 weight % or less, due to the possibility of giving rise to environmental problems, such as gases and the like generated during the molding process, to reduced productivity due to deposition on manufacturing equipment, or to poor appearance due to deposition on the composite.

From the standpoint of effects on strength of the composite body due to water absorbing, the present invention is applicable to the case where the thermoplastic resin composition (2A) contains thermoplastic resin (2a) having a water-absorbing property in an amount of preferably 20 weight % or more, more preferably 30 weight % or more, still more preferably 40 weight % or more.

Since the thermoplastic resin composition (2A) may contain a thermoplastic resin not having a water-absorbing property other than the thermoplastic resin having a water-absorbing property in order to reduce a percentage of water absorption and improve impact strength of the thermoplastic resin composition itself. In this case, since it is generally poor in chemical compatibility with the thermoplastic resin having a water-absorbing property and deteriorates surface appearance at molding process and welding strength of the composite body, it is preferably contained in an amount of 40 weight % or less based on the total amount of the thermoplastic resin composition (2A). Further, of these the non-water-absorbing thermoplastic resins, there are many resins that are relatively poor in heat resistance and bonding property with metal, such as polyolefin resins. Accordingly, in consideration of these points, the amount thereof is preferably 20 weight % or less.

[Metal Hydroxide (2b)]

The metal hydroxide (2b) contained in the thermoplastic resin composition (2A) includes metal hydroxide where metal is an alkali metal of Li, Na, K, Rb, Cs, or Fr, metal hydroxide where metal is an alkali earth metal of Be, Mg, Ca, Sr, Ba, or Ra, and metal hydroxide where metal is Fe, Mn, Zn or Al, with magnesium hydroxide being preferable from the standpoint of water resistance of the composite body.

The compounding amount of the metal hydroxide (2b) is preferably 0.1 to 20 weight % based on the total amount of the thermoplastic resin composition (2A). In consideration of properties of the thermoplastic resin composition (2A), it is more preferably 0.1 to 15 weight %, and still more preferably more than 1 weight % from the standpoint of stabilization of high bonding strength of the composite body when water-absorbed, particularly preferably 2 to 10 weight %.

In consideration of the cost, the particle size of the metal hydroxide (2b) is preferably 1 μm or larger, while from the standpoint of bonding strength of the metal (B) and the thermoplastic resin composition (2A) of the composite body, it is more preferably more than 1.9 μm. From the standpoint of dispersibility in the thermoplastic resin and water resistance of the composite body, the average diameter of the metal hydroxide is preferably 0.1 μm or smaller. Further, from the standpoint of general properties, particularly impact strength of the thermoplastic resin composition (2A), 20 μm or smaller is preferred.

The mean particle size of the metal hydroxide (2b) is measured by sampling the metal hydroxide in accordance with, for example, Powder mass mixtures—general rules for methods of sampling, JIS M8100 specified in Japanese Industrial Standards; preparing the metal hydroxide as a sample for measurement in accordance with General rules for sample preparation for particle size analysis of fine ceramic raw powders, JIS R1622-1995; and measuring in accordance with Determination of particle size distribution of fine ceramic raw powders by laser diffraction method, JIS R 1629-1997. A SALD-7000 laser diffraction type particle size distribution measurement device, made by Shimadzu Corp., or the like, can be used as the device.

Magnesium hydroxide contains impurities such as calcium oxide and boron oxide for the reason of producing process. Magnesium hydroxide is classified two or three stages according to purification levels. Magnesium hydroxide having a purity of about 96 weigh % or more is preferred.

"Purity" referred to here is a magnesium oxide-reduced purity. That is, it is the value that is determined by multiplying the amount of magnesium oxide obtained by calcining the magnesium hydroxide powder by 1.45 and dividing the resulted value by the original weight to reduce the magnesium hydroxide equivalent amount.

Regarding surface treatment of the metal hydroxide (2b), where the metal hydroxide (2b) is surface-treated, reactivity of the interface between the thermoplastic resin composition (2A) and the metal (B) may deteriorate. Accordingly, it is preferred not to perform surface treatment of the metal hydroxide (2b) also from the standpoint of cost.

[Inorganic Filler for Raising by 3° C. or More the Crystallization Temperature]

The thermoplastic resin composition (2A) may contain an inorganic filler for raising by 3° C. or more the crystallization temperature. The inorganic filler for raising by 3° C. or more the crystallization temperature includes talc, magnesium oxide, calcium carbonate, or the like, and the representative example is talc. In the case of talc, the compounding amount is preferably 0.01 weight % or more and 50 weight % or less based on 100 weight parts of the thermoplastic resin composition. From the standpoint of bonding strength, it is more preferably 0.05 weight % or more and 20 weight % or less, and particularly preferably 5 weight % or more and 20 weight % or less. Depending on the type of thermoplastic resin, the type of metal, and the surface treatment method thereof, a state of adequate bonding may be obtained even at 0.05 weight %, and it is therefore desirable to select the compounding amount in a manner dependent on the application of the composite body.

There are no particular limitations as to the mean particle size of talc, but in consideration of the appearance and impact strength of the molded product, 20 μm or smaller is preferable, while from the standpoint of bonding to metal, 3 to 15 μm is desirable. Talc may be subjected to a coupling treatment in order to improve cohesion to the resin, to thereby enhance the mechanical properties and molded appearance. As coupling agents, silane coupling agents, epoxy silane coupling agents, and the like may be cited. The added amount for treatment can be from 0.01 to 5 weight parts per 100 weight parts of talc.

The thermoplastic resin composition (2A) may contain customarily compounded additives, modifiers, and reinforcing materials of various types, in amounts such that the characteristics of the present invention are not diminished, which includes, for example, thermal stabilizers, antioxidants, UV absorbers, weathering agents, fillers, plasticizers, blowing agents, anti-blocking agents, tackifying agents, sealing improvers, antifogging agents, release agents, cross-linking agents, blowing agents, flame retardants, coloring agents (pigments, dyes, and the like), coupling agents, glass fibers, inorganic reinforcing materials such as kaolin and the like. From the standpoint of improvement of the bonding strength of the composite body, it preferably contains glass fibers. The compounding amount of glass fibers is preferably 10 to 50 weight %, more preferably 15 to 45 weight % based on the total amount of the thermoplastic resin composition (2A).

There are no particular limitations as to the method for compounding various additives into the thermoplastic resin, and there may be cited conventional methods such as dry-blending methods employing a tumbler or mixer; incorporating method through melt-kneading in advance at the concentration to be used during molding, employing a single-screw or twin-screw extruder; a masterbatch method involving incorporation into the starting material in advance at high concentration, employing a single-screw or twin-screw extruder, followed by dilution for use at the time of molding, or the like.

[Metal (B)]

There are no particular limitations as to the kinds of the metal (B) of the present invention. For example, iron, copper, nickel, gold, silver, platinum, cobalt, zinc, lead, tin, titanium, chromium, aluminum, magnesium, manganese, and alloys thereof (stainless steel, brass, phosphor bronze, and the like) can be cited. Metals having a thin film or coating of metal (metal plating, a deposited film, a coating film, or the like) may be targeted as well. The metal (B) is preferably surface-treated. As a method of surface treatment, there is preferably used the same method as applied to the metal (B) in the case where the thermoplastic resin (A) is the polyamide elastomer (1A).

[Composite Body (2A-B)]

From the standpoint of productivity, the composite (2A-B) of the present invention is preferably produced by arranging the metal (B) on one die, closing the die, introducing the thermoplastic resin composition (2A) into the injection molder from the hopper of the injection molder, and injecting the molten resin into the die, then opening and parting the moveable die. On the other hand, the thermoplastic resin composition (2A) may be produced in advance, and the part of thus produced thermoplastic resin composition (2A) and the metal may be fusion-bonded to produce a composite body. In this case, it is preferred to produce the part of the thermoplastic resin composition (2A) by injection molding. The reason is that the process brings about low cost and an increase in freedom of design, such as unnecessity of re-creating a mold for producing the part of the thermoplastic resin composition (2A).

The conditions for injection molding will differ depending on the type of thermoplastic resin (2a), and there are no particular limitations, but the die temperature is preferably from 10° C. to 160° C. Generally, from the standpoint of product qualities such as strength, and of the molding cycle, from 40° C. to 120° C. is more preferred, with 60° C. to 140° C. being still more preferred.

The bonding strength of the composite body (2A-B) is preferably 7 MPa or higher, more preferably 10 MPa or higher, still more preferably more than 13 MPa in a state where the thermoplastic resin composition (2A) in the composite body has a water absorption of 6-7 weight %.

Even if the composite body (2A-B) is immersed in hot water for a long time, the bonding strength thereof lowers not much, and also the bonding strength before immersion in hot water is high. Further, when it is destroyed after immersion, remaining condition of resin on the surface of the metal is good.

In the present invention, a water resistance of the composite body is improved by adding metal hydroxide to resin. Accordingly, even the composite body using a polyamide resin having a low water resistance, a water resistance of the composite body can be improved without exchanging the polyamide resin for a resin having a high water resistance such as polyphenylene sulfide resin. Therefore, it is unnecessary to improve a water resistance of the metal side, and to improve a water resistance of the composite body by using together compensating means such as bolts or packings. Further, it is unnecessary to coat the peripheral part of the bonding portion with adhesive agent or the like in order to prevent water or steam from penetrating. Accordingly, it is possible to inhibit increase in cost, and to ensure freedom of design of the composite body since it is unnecessary to add change or limitation to design of the composite body.

Since the resin and the metal are sufficiently bonded in the composite body (2A-B) of the present invention, the composite body can be applied for a wide variety of purposes, such as automotive components, electrical/electronic components, general mechanical components, sheets, tape, pipes, tubes, and the like, and the composite is particularly suitable for use in applications in which heat resistance, minimal gas/liquid permeability, dimensional/shape stability, electrical conductivity, heat conductivity, and strength are required concomitantly, such as in automotive fuel components, for example. Further, since the composite body (2A-B) of the present invention is excellent in water resistance, it can be applied to uses in outdoor or high humidity atmosphere, such as a body, an exterior, an engine room of a car, or the like.

In the producing process of the composite body (2A-B), since the resin and the metal can be bonded by injection molding, or the molded resin and the metal can be fusion-bonded after injection molding, processes of coating adhesive agent or the like are unnecessary. Owing to this, freedom of product design can be ensured and processing cost can be reduced.

EXAMPLES

Experimental Examples 1 and 2

There will be described examples in the case where the thermoplastic resin (A) employed in the present invention is polyamide elastomer (1A), but these examples do not limit the object of the present invention.

First, measuring methods employed in examples are described as follows:

(Bonding Tenacity 1)

The case where one member of the composite body can be separated from the other member by hand although resistance is sensed, is defined as "adhesion". The case where the bonding tenacity cannot be measured since the metal and the resin are separated from each other when the composite body obtained by injection molding (bonding area is 30 mm×30 mm, 900 mm$^2$) is attached to TENSILON manufactured by ORIENTEK Co., LTD with a distance between chucks of 100 mm, is defined as "incapable measurement".

(Bonding Tenacity 2)

The obtained resin plate and the metal were bonded using hot press machine (manufactured by SINTO METAL Industries Corporation) at a temperature of melting point plus 25° C. to obtain a test piece for measuring a bonding tenacity. In this case, bonding area was 30 mm×30 mm, 900 mm$^2$.

This test piece for measuring a bonding tenacity was attached to TENSILON manufactured by ORIENTEK Co., LTD with a distance between chucks of 100 mm. Maximum shear peel strength was measured at a tensile speed of 50 mm/min., three times. The average value was determined as a bonding tenacity.

(Bonding Tenacity 3)

After the obtained resin plate was defatted with ethanol, thus defatted resin plate was put between two metal plates and subjected to press working (press condition, press temperature: melting point plus 25° C., pressurization: 4 Mpa, 1 min.) to obtain a test piece for measuring a bonding tenacity. In this case, the area of the resin plate was 30 mm×10.4 mm.

This test piece for measuring a bonding tenacity was subjected to tensile test using TENSILON manufactured by ORIENTEK Co., LTD with a distance between chucks of 100 mm at a tensile speed of 50 mm/min., three times for each grade to obtain maximum shear peel strengths. The average value was determined as a bonding tenacity.

(Tensile Properties)

Tensile elongation at break: Tensile elongation at break of a test piece ISO Type A (test part: thickness×width×length=4×10×80 mm) described in ISO527-1,2 was measured according to ISO527-1,2. Tensile speed of the test piece was 1 mm/min.

Tensile elastic modulus: Tensile elastic modulus of the test piece was measured according to ISO527-1,2 at a test speed of 1 mm/min.

The bonding strength depends on an elastic modulus of material. Therefore, relative comparison, not absolute comparison, correctly estimates affinity to metal. Accordingly, the value obtained dividing the bonding tenacity by an elastic modulus was defined as an index of the bonding strength as shown in the following equation (3).

$$\text{Bonding tenacity to tensile elastic modulus} = \text{bonding tenacity/tensile elastic modulus} \times 100 \quad (3)$$

It is seen that as the value of the equation (3) increases, an affinity of material to metal becomes high.

(Impact Resistance)

Impact strength (Charpy): Impact strength of notched test piece was measured at 23° C. according to ISO179-1/1 eV.
NB: Not broken
C: Completely broken
P: Partially broken Experimental Example 1: The Case where the Composite Body is Molded by Injection Molding Example 1

A SUS 304 test piece surface-untreated (manufactured by ALMOULD Corporation) was attached to an SE-100D injection molder made by Sumitomo Heavy Industries Co. Ltd., and positioned in a die for forming the composite body. Polyamide elastomer (UBESTA XPA 9040X1, produced by UBE Industries, Ltd.) was introduced into the injection molder, and injected into the die (at a die temperature of 60° C.) at a resin temperature of 250° C., and after 30 seconds at a holding pressure of 10 MPa, was cooled in the die for 20 seconds, to obtain a composite body. In the composite body, polyamide elastomer and SUS304 were adhesive to each other. Tensile elastic modulus, tensile elongation at break, and impact resistance of the polyamide elastomer was measured. The results are shown in Table 1.

Comparative Example 1

A composite body of Comparative Example 1 was produced in the same manner as Example 1, except that Polyamide 12 (3014U: produced by UBE Industries, Ltd.) was used instead of polyamide elastomer. In the composite body, Polyamide 12 and SUS304 does not adhere to each other. Tensile elastic modulus, tensile elongation at break and impact resistance of Polyamide 12 were measured. The results are shown in Table 1.

TABLE 1

| | | Example 1 | Comparative Example 2 |
|---|---|---|---|
| Elastomer weight % | PAE | 100 | |
| | PA12 | | 100 |
| Metal | SUS304 (untreated) | ○ | ○ |
| Molding method | Injection Molding | ○ | ○ |
| Properties | Bonding tenacity 1 (N/cm$^2$) | adhesive | incapable measurement |
| | Tensile elastic modulus (MPa) | 90 | 1970 |
| | Tensile elongation at break (%) | >400 | 250 |
| | Impact resistance (Charpy/23° C.) | NB | 3C |

Experimental Example 2: The Case where the Composite Body is Molded by Hot Pressing Example 2

93 weight % of Polyamide elastomer 1 (UBESTA XPA 9040X1, produced by UBE Industries, Ltd.) and 7 weight % of talc (SIMGON M, a mean particle size of 14 μm: produced by NIPPON TALC Co., Ltd.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. The obtained molded product was bonded to SUS304 (manufactured by ALMOULD Corporation), which was surface-treated by a method using a triazine dithiol derivative, described in JPN Examined Patent publication 05-51671, by hot press machine (manufactured by SINTO METAL Industries Corporation) at a set temperature of 160° C. to obtain an evaluation product. In this case, the bonding area was 30 mm×30 mm, 900=$^2$. Tensile elastic modulus, tensile elongation at break and impact resistance of the composition, and bonding tenacity 2 of the evaluation product were measured. The results are shown in Table 2.

Examples 3-4

A polyamide elastomer composition and an evaluation product were produced in the same manner as Example 2, except that compounding ratio of the polyamide elastomer and talc was changed. Tensile elastic modulus, tensile elongation at break and impact resistance of the composition, and bonding tenacity 2 of the evaluation product were measured. The results are shown in Table 2.

Example 5

89.9 weight % of Polyamide elastomer 1 (UBESTA XPA9040X1, produced by UBE Industries, Ltd.), 10 weight % of talc (SIMGON M, a mean particle size 14 μm: produced by NIPPON TALC Co., Ltd.), and 0.1 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. The obtained molded product was bonded to SUS304 (manufactured by ALMOULD Corporation), which was surface-treated by a method using a triazine dithiol derivative, described in JPN Examined Patent publication 05-51671, by hot press machine (manufactured by SINTO METAL Industries Corporation) at a set temperature of 160° C. to obtain an evaluation product. In this case, the bonding area was 30 mm×30 mm, 900=$^2$. Tensile elastic modulus, tensile elongation at break and impact resistance of the composition, and bonding tenacity 2 of the evaluation product were measured. The results are shown in Table 2.

Examples 6-7

A polyamide elastomer composition and an evaluation product were produced in the same manner as Example 5, except that compounding ratio of the polyamide elastomer and silane coupling agent was changed. Tensile elastic modulus, tensile elongation at break and impact resistance of the composition, and bonding tenacity 2 of the evaluation product were measured. The results are shown in Table 2.

Example 8

89.8 weight % of Polyamide elastomer 1 (UBESTA XPA9040X1, produced by UBE Industries, Ltd.), 10 weight % of talc (LS-408, mean particle size 13 μm: produced by Ube Material Industries Co. Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. The obtained molded product was bonded to SUS304 (manufactured by ALMOULD Corporation), which was surface-treated by a method using a triazine dithiol derivative, described in JPN Examined Patent publication 05-51671, by hot press machine (manufactured by SINTO METAL Industries Corporation) at a set temperature of 160° C. to obtain an evaluation product. In this case, the bonding area was 30 mm×30 mm, $900=^2$. Tensile elastic modulus, tensile elongation at break and impact resistance of the composition, and bonding tenacity 2 of the evaluation product were measured. The results are shown in Table 2.

Example 9

89.8 weight % of Polyamide elastomer 1 (UBESTA XPA9040X1, produced by UBE Industries, Ltd.), 10 weight % of talc (SG-95, mean particle size 2.5 μm: produced by NIPPON TALC Co., Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. The obtained molded product was bonded to SUS304 (manufactured by ALMOULD Corporation), which was surface-treated by a method using a triazine dithiol derivative, described in JPN Examined Patent publication 05-51671, by hot press machine (manufactured by SINTO METAL Industries Corporation) at a set temperature of 160° C. to obtain an evaluation product. In this case, the bonding area was 30 mm×30 mm, 900 mm². Tensile elastic modulus, tensile elongation at break and impact resistance of the composition, and bonding tenacity 2 of the evaluation product were measured. The results are shown in Table 2.

Example 10

An evaluation product was produced in the same manner as Example 2, except that a single substance of polyamide elastomer (UBESTA XPA 9040X1, produced by UBE Industries, Ltd.) was used instead of polyamide elastomer composition. Tensile elastic modulus, tensile elongation at break and impact resistance of the composition, and bonding tenacity 2 of the evaluation product were measured. The results are shown in Table 2.

Comparative Example 2

Polyamide 12 (3014U: produced by UBE Industries, Ltd.) was subjected to injection molding (cylinder temperature: 200° C., die temperature: 40° C., cooling time: 30 seconds) to form a resin plate having a thickness of 3 mm. The obtained molded product was bonded to SUS304 (manufactured by ALMOULD Corporation), which was surface-treated by a method using a triazine dithiol derivative, described in JPN Examined Patent publication 05-51671, by hot press machine (manufactured by SINTO METAL Industries Corporation) at a set temperature of 160° C. to obtain an evaluation product. In this case, the bonding area was 30 mm×30 mm, 900 mm². Tensile elastic modulus, tensile elongation at break and impact resistance of the composition, and bonding tenacity 2 of the evaluation product were measured. The results are shown in Table 2.

Comparative Example 3

89.8 weight % of Polyamide 12 (3014U: produced by UBE Industries, Ltd.), 10 weight % of talc (SIMGON M, mean particle size 14 μm: produced by NIPPON TALC Co., Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of screw of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 200° C., die temperature: 40° C., cooling time: 30 seconds) to form a resin plate having a thickness of 3 mm. The obtained molded product was bonded to SUS304 (manufactured by ALMOULD Corporation), which was surface-treated by a method using a triazine dithiol derivative, described in JPN Examined Patent publication 05-51671, by hot press machine (manufactured by SINTO METAL Industries Corporation) at a set temperature of 160° C. to obtain an evaluation product. In this case, the bonding area was 30 mm×30 mm, $900=^2$. Tensile elastic modulus, tensile elongation at break and impact resistance of the composition, and bonding tenacity 2 of the evaluation product were measured. The results are shown in Table 2.

TABLE 2

|  |  | Example2 | Example3 | Example4 | Example5 | Example6 | Example7 | Example8 | Example9 | Example10 | Com. Ex. 2 | Com. Ex. 3 |
|---|---|---|---|---|---|---|---|---|---|---|---|---|
| Elastomer (weight %) | PAE1 | 93 | 90 | 80 | 89.9 | 89.8 | 89.7 | 89.8 | 89.8 | 100 |  |  |
|  | PA12 |  |  |  |  |  |  |  |  |  | 100 | 89.8 |
| Filler (weight %) | Talc(14 μm) | 7 | 10 | 20 | 10 | 10 | 10 |  |  | 0 | 0 | 10 |
|  | Talc(13 μm) |  |  |  |  |  |  | 10 |  |  |  |  |
|  | Talc(2.5 μm) |  |  |  |  |  |  |  | 10 |  |  |  |
| Silan Coupling Agent (weight %) | Aminosilane | 0 | 0 | 0 | 0.1 | 0.2 | 0.3 | 0.2 | 0.2 | 0 | 0 | 0.2 |
| Metal | SUS304 (surface-treated) | ○ | ○ | ○ | ○ | ○ | ○ | ○ | ○ | ○ | ○ | ○ |
| Molding Method | Hot pressing | ○ | ○ | ○ | ○ | ○ | ○ | ○ | ○ | ○ | ○ | ○ |
| Properties | Bonding tenacity 2 (N/cm²) | 91 | 93 | 109 | 100 | 104 | 109 | 109 | 112 | 72 | 63 | 555 |
|  | Tensile elastic modulus (MPa) | 130 | 145 | 212 | 130 | 127 | 129 | 128 | 159 | 90 | 1970 | 2300 |
|  | Ratio of bonding tenecity 2 to tensile elastic modulus (%) | 70 | 64 | 51 | 77 | 82 | 84 | 85 | 70 | 80 | 3 | 24 |
|  | Tensile elongation at break (%) | >400 | >400 | >400 | >400 | >400 | >400 | >400 | >400 | >400 | 250 | 47 |
|  | Impact resistance (Charpy/23° C.) | NB | NB | NB | NB | NB | NB | NB | NB | NB | 3C | 3C |

Com. Ex.: Comparative Example

Example 11

95 weight % of Polyamide elastomer 1 (UBESTA XPA 9040X1, produced by UBE Industries, Ltd.) and 5 weight % of talc (SIMGON M, mean particle size 14 μm: produced by NIPPON TALC Co., Ltd.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two SUS304 plates (manufactured by ALMOULD Corporation), which were surface-treated by a method using a triazine dithiol derivative, described in JPN Examined Patent publication 05-51671, pressed (pressing condition, molding temperature: 160° C., pressure: 4 Mpa, 1 min.), and cooled (250 kgf/cm², 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

Example 12

79.95 weight % of Polyamide elastomer 1 (UBESTA XPA 9040X1, produced by UBE Industries, Ltd.), 20 weight % of talc (SIMGON M, mean particle size 14 μm: produced by NIPPON TALC Co., Ltd.), and 0.05 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two SUS304 plates (manufactured by ALMOULD Corporation), which were surface-treated by a method using a triazine dithiol derivative, described in JPN Examined Patent publication 05-51671, pressed (pressing condition, molding temperature: 160° C., pressure: 4 Mpa, 1 min.), and cooled (250 kgf/cm², 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

Example 13

79.8 weight % of Polyamide elastomer 1 (UBESTA XPA 9040X1, produced by UBE Industries, Ltd.), 20 weight % of talc (SIMGON M, mean particle size 14 μm: produced by NIPPON TALC Co., Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two SUS304 plates (manufactured by ALMOULD Corporation), which were surface-treated by a method using a triazine dithiol derivative, described in JPN Examined Patent publication 05-51671, pressed (pressing condition, molding temperature: 160° C., pressure: 4 Mpa, 1 min.), and cooled (250 kgf/cm$^2$, 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

Example 14

79.7 weight % of Polyamide elastomer 1 (UBESTA XPA 9040X1, produced by UBE Industries, Ltd.), 20 weight % of talc (SIMGON M, mean particle size 14 μm: produced by NIPPON TALC Co., Ltd.), and 0.3 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two SUS304 plates (manufactured by ALMOULD Corporation), which were surface-treated by a method using a triazine dithiol derivative, described in JPN Examined Patent publication 05-51671, pressed (pressing condition, molding temperature: 160° C., pressure: 4 Mpa, 1 min.), and cooled (250 kgf/cm$^2$, 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

Example 15

79.8 weight % of Polyamide elastomer 1 (UBESTA XPA 9040X1, produced by UBE Industries, Ltd.), 20 weight % of talc (LS-408, mean particle size 13 μm: produced by Ube Material Industries Co. Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two SUS304 plates (manufactured by ALMOULD Corporation), which were surface-treated by a method using a triazine dithiol derivative, described in JPN Examined Patent publication 05-51671, pressed (pressing condition, molding temperature: 160° C., pressure: 4 Mpa, 1 min.), and cooled (250 kgf/cm$^2$, 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

Example 16

79.8 weight % of Polyamide elastomer 1 (UBESTA XPA 9040X1, produced by UBE Industries, Ltd.), 20 weight % of talc (SIMGON M, mean particle size 2.5 μm: produced by NIPPON TALC Co., Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two SUS304 plates (manufactured by ALMOULD Corporation), which were surface-treated by a method using a triazine dithiol derivative, described in JPN Examined Patent publication 05-51671, pressed (pressing condition, molding temperature: 160° C., pressure: 4 Mpa, 1 min.), and cooled (250 kgf/cm$^2$, 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

Example 17

79.8 weight % of Polyamide elastomer 1 (UBESTA XPA 9040X1, produced by UBE Industries, Ltd.), 20 weight % of MgO (RF-10C-AC, mean particle size 10 μm: produced by Ube Material Industries Co. Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two SUS304 plates (manufactured by ALMOULD Corporation), which were surface-treated by a method using a triazine dithiol derivative, described in JPN Examined Patent publication 05-51671, pressed (pressing condition, molding temperature: 160° C., pressure: 4 Mpa, 1 min.), and cooled (250 kgf/cm$^2$, 3 min.) to obtain an evaluation product. In this case, the bonding area was 30 mm×10.4 mm. Tensile elastic

Example 18

79.8 weight % of Polyamide elastomer 1 (UBESTA XPA 9040X1, produced by UBE Industries, Ltd.), 20 weight % of Mg(OH)$_2$ (UD-650-1, mean particle size 3.5 μm: produced by Ube Material Industries Co. Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two SUS304 plates (manufactured by ALMOULD Corporation), which were surface-treated by a method using a triazine dithiol derivative, described in JPN Examined Patent publication 05-51671, pressed (pressing condition, molding temperature: 160° C., pressure: 4 Mpa, 1 min.), and cooled (250 kgf/cm$^2$, 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

Example 19

79.8 weight % of Polyamide elastomer 1 (UBESTA XPA 9040X1, produced by UBE Industries, Ltd.), 20 weight % of talc (SIMGON M, mean particle size 14 μm: produced by NIPPON TALC Co., Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two Cu:C-2801P plates (manufactured by ALMOULD Corporation), which were surface-treated by a method using a triazine dithiol derivative, described in JPN Examined Patent publication 05-51671, pressed (pressing condition, molding temperature: 160° C., pressure: 4 Mpa, 1 min.), and cooled (250 kgf/cm$^2$, 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

Example 20

79.8 weight % of Polyamide elastomer 1 (UBESTA XPA 9040X1, produced by UBE Industries, Ltd.), 20 weight % of talc (SIMGON M, mean particle size 14 μm: produced by NIPPON TALC Co., Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two A1:A5052 plates (manufactured by ALMOULD Corporation), which were surface-treated by a method using a triazine dithiol derivative, described in JPN Examined Patent publication 05-51671, pressed (pressing condition, molding temperature: 160° C., pressure: 4 Mpa, 1 min.), and cooled (250 kgf/cm$^2$, 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

Example 21

79.8 weight % of Polyamide elastomer 1 (UBESTA XPA 9040X1, produced by UBE Industries, Ltd.), 20 weight % of talc (SIMGON M, mean particle size 14 μm: produced by NIPPON TALC Co., Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two SUS304 plates (manufactured by ALMOULD Corporation), which were surface-untreated, pressed (pressing condition, molding temperature: 160° C., pressure: 4 Mpa, 1 min.), and cooled (250 kgf/cm$^2$, 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

Example 22

79.8 weight % of Polyamide elastomer 2 (UBESTA XPA 9035X, produced by UBE Industries, Ltd.), 20 weight % of talc (SIMGON M, mean particle size 14 μm: produced by NIPPON TALC Co., Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two SUS304 plates (manufactured by ALMOULD Corporation), which were surface-treated by a method using a triazine dithiol derivative, described in JPN Examined Patent publication 05-51671, pressed (pressing condition, molding temperature: 150° C., pressure: 4 Mpa, 1 min.), and cooled (250 kgf/cm$^2$, 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

Example 23

79.8 weight % of Polyamide elastomer 3 (PEBAX 5533, produced by ARKEMA Co.), 20 weight % of talc (SIMGON M, mean particle size 14 μm: produced by NIPPON TALC Co., Ltd.), and 0.2 weight % of silane coupling agent (SILQUEST A-1100: produced by Momentive Performance Materials Inc.) were introduced into a cylindrical type mixer, and dry-blended. The obtained mixture was introduced into a biaxial kneader (TEX44: manufactured by THE JAPAN STEEL WORKS, LTD.), melt-kneaded on conditions of a set temperature of 170° C., a rotational speed of 200 rpm., and a discharge rate of 20 kg/hr., and extruded in the form of strings. The extruded strings were cooled in a water bath, and pelletized by pelletizer to obtain pellets of a polyamide elastomer composition. The obtained pellets were molded by injection molding (cylinder temperature: 190° C., die temperature: 40° C., cooling time: 30 seconds) to form a resin plate having a thickness of 3 mm. After the obtained resin plate was degreased with ethanol, it was sandwiched between two SUS304 plates (manufactured by ALMOULD Corporation), which were surface-treated by a method using a triazine dithiol derivative, described in JPN Examined Patent publication 05-51671, pressed (pressing condition, molding temperature: 185° C., pressure: 4 Mpa, 1 min.), and cooled (250 kgf/cm$^2$, 3 min.) to obtain an evaluation product. In this case, the bonding area was 30 mm×10.4 mm. Tensile elastic modulus, tensile elongation at break and impact resistance of the composition, and bonding tenacity 3 of the evaluation product were measured. The results are shown in Table 3.

TABLE 3

|  |  | Example 11 | Example 12 | Example 13 | Example 14 | Example 15 | Example 16 | Example 17 |
|---|---|---|---|---|---|---|---|---|
| Elastomer (wt. %) | PAE1 | 95 | 79.95 | 79.8 | 79.7 | 79.8 | 79.8 | 79.8 |
|  | PAE2 |  |  |  |  |  |  |  |
|  | PAE3 |  |  |  |  |  |  |  |
| Filler (wt. %) | Talc(14 μm) | 5 | 20 | 20 | 20 |  |  |  |
|  | Talc(13 μm) |  |  |  |  | 20 |  |  |
|  | Talc(2.5 μm) |  |  |  |  |  | 20 |  |
|  | MgO(RF-10C-AC) |  |  |  |  |  |  |  |
|  | Mg(OH)$_2$(UD-650-1) |  |  |  |  |  |  | 20 |
| Silane Coupling Agent (wt %) | Aminosilane | 0 | 0.05 | 0.2 | 0.3 | 0.2 | 0.2 | 0.2 |
| Metal | Cu (surface-treated) |  |  |  |  |  |  |  |
|  | Al (surface-treated) |  |  |  |  |  |  |  |
|  | SUS304(surface-trated) | ○ | ○ | ○ | ○ | ○ | ○ | ○ |
|  | SUS304(surface-untreated) |  |  |  |  |  |  |  |
| Molding Method | Hot pressing | ○ | ○ | ○ | ○ | ○ | ○ | ○ |
| Properties | Bonding tenacity3(N/mm) | 389 | 327 | 515 | 547 | 474 | 663 | 721 |
|  | Tencile elongation at break (%) | >400 | >400 | >400 | >400 | >400 | >400 | >400 |
|  | Tencile elastic modulus(MPa) | 138 | 212 | 205 | 191 | 202 | 229 | 134 |
|  | Ratio of bonding tenacity 3 to tencile elastic modulus(%) | 282 | 154 | 251 | 286 | 235 | 290 | 538 |
|  | Impact resistance(Charpy/ 23° C.) | NB | NB | NB | NB | NB | NB | NB |

|  |  | Example 18 | Example 19 | Example 20 | Example 21 | Example 22 | Example 23 |
|---|---|---|---|---|---|---|---|
| Elastomer (wt. %) | PAE1 | 79.8 | 79.8 | 79.8 | 79.8 |  |  |
|  | PAE2 |  |  |  |  | 79.8 |  |
|  | PAE3 |  |  |  |  |  | 79.8 |
| Filler (wt. %) | Talc(14 μm) |  | 20 | 20 | 20 | 20 | 20 |
|  | Talc(13 μm) |  |  |  |  |  |  |
|  | Talc(2.5 μm) |  |  |  |  |  |  |
|  | MgO(RF-10C-AC) |  |  |  |  |  |  |
|  | Mg(OH)$_2$(UD-650-1) | 20 |  |  |  |  |  |
| Silane Coupling Agent (wt. %) | Aminosilane | 0.2 | 0.2 | 0.2 | 0.2 | 0.2 | 0.2 |

TABLE 3-continued

| | | | | | | | |
|---|---|---|---|---|---|---|---|
| Metal | Cu (surface-treated) | | ○ | | | | |
| | Al (surface-treated) | | | ○ | | | |
| | SUS304(surface-trated) | ○ | | | | ○ | ○ |
| | SUS304(surface-untreated) | | | | ○ | | |
| Molding Method | Hot pressing | ○ | ○ | ○ | ○ | ○ | ○ |
| Properties | Bonding tenacity3(N/mm) | 628 | 455 | 399 | 502 | 378 | 495 |
| | Tencile elongation at break (%) | >400 | >400 | >400 | >400 | >400 | 343 |
| | Tencile elastic modulus(MPa) | 120 | 205 | 205 | 205 | 152 | 396 |
| | Ratio of bonding tenacity 3 to tencile elastic modulus(%) | 523 | 222 | 195 | 245 | 249 | 125 |
| | Impact resistance(Charpy/ 23° C.) | NB | NB | NB | NB | NB | 68P |

It is found that even if an inorganic filler such as talc are not added and metal is surface-untreated, a composite body having an excellent bonding tenacity can be produced by using polyimide elastomer, and a composite body having a further excellent bonding tenacity can be produced by adding an inorganic filler and/or a coupling agent to polyamide elastomer.

Experimental Example 3

The case where the thermoplastic resin (A) is the thermoplastic resin composition (2A) containing thermoplastic resin (2a) having a water absorption and metal hydroxide (2b) is described more specifically below, but is not limited to the following examples insofar as there is no departure from the scope of the present invention. The raw materials used and the types of evaluation methods are shown next.

(Thermoplastic Resin Composition (2A))

Polyamide Resin Composition (2A-1)

Polyamide resin composition (2A-1) (hereinafter designated as (2A-1)) includes 30 weight % of glass fiber (ECSO3T-249: produced by Nippon Electric Glass Co., Ltd), 20 weight % of surface-untreated magnesium hydroxide having mean particle size of 3.4 μm and purity of 96.6%, and 50 weight % of Polyamide 6 having water-extracted content of 5 weight % or less.

Polyamide Resin Composition (2A-2)

Polyamide resin composition (2A-2) (hereinafter designated as (2A-2)) has the same composition as that of polyamide resin composition (2A-1) except surface-untreated magnesium hydroxide having mean particle size of 3.4 μm and purity of 97.3% is used as magnesium hydroxide.

Polyamide Resin Composition (2A-3)

Polyamide resin composition (2A-3) (hereinafter designated as (2A-3)) has the same composition as that of polyamide resin composition (2A-1) except surface-untreated magnesium hydroxide having mean particle size of 2.0 μm and purity of 98.8% is used as magnesium hydroxide.

Polyamide Resin Composition (2A-4)

Polyamide resin composition (2A-4) (hereinafter designated as (2A-4)) has the same composition as that of polyamide resin composition (2A-1) except magnesium hydroxide having mean particle size of 1.9 μm and purity of 98.8%, and surface-treated with 1 weight % of vinyl silane coupling agent based on the total amount of magnesium hydroxide and vinyl silane coupling agent is used as magnesium hydroxide.

Polyamide Resin Composition (2A-5)

Polyamide resin composition (2A-5) (hereinafter designated as (2A-5)) has the same composition as that of polyamide resin composition (2A-1) except glass fiber is removed, and 80 weight % of Polyamide 6 is used.

Polyamide Resin Composition (2A-6)

Polyamide resin composition (2A-6) (hereinafter designated as (2A-6)) has the same composition as that of polyamide resin composition (2A-3) except glass fiber is removed, and 80 weight % of Polyamide 6 is used.

Polyamide Resin Composition (X-1)

Polyamide resin composition (X-1) (hereinafter designated as (X-1)) includes 30 weight % of glass fiber (ECSO3T-249: produced by Nippon Electric Glass Co., Ltd), and 70 weight % of Polyamide 6 having a relative viscosity of 2.64 and an aqueous extraction fraction of 5 weight % or less.

Polyamide Resin Composition (X-2)

Polyamide resin composition (X-2) (hereinafter designated as (X-2)) includes 30 weight % of glass fiber (ECSO3T-249: produced by Nippon Electric Glass Co., Ltd), 20 weight % of talc having a mean particle size of 14 μm and surface-treated with 1 weight % of amino silane coupling agent based on the total amount of the talc and amino silane coupling agent, and 50 weight % of Polyamide 6 having a relative viscosity of 2.64 and an aqueous extraction fraction of 5 weight % or less.

Polyamide Resin Composition (X-3)

Polyamide resin composition (X-3) (hereinafter designated as (X-3)) includes 20 weight % of talc having a mean particle size of 14 μm and surface-treated with 1 weight % of amino silane coupling agent based on the total amount of the talc and amino silane coupling agent, and 80 weight % of Polyamide 6 having a relative viscosity of 2.64 and an aqueous extraction fraction of 5 weight % or less.

Polyamide 6 (X-4)

Polyamide 6 (X-4) (hereinafter designated as (X-4)) having a relative viscosity of 2.64 and an aqueous extraction fraction of 5 weight % or less.

(Metal (B))

Aluminum A5052 specified in JIS H4040:2006, and having dimensions of 12 mm×12 mm and length of 150 mm were prepared.

The surfaces of the metal were subjected to surface treatment employing the technique disclosed in Patent Publication No. 4541153 for fine uneven surface processing to the metal surface.

After the surface-treated metal was weighed, it was placed in a multilayer pouch of polyethylene and aluminum, sealed with a heat sealing machine, and kept at room temperature until just before bonding molding to the resin.

(Water Absorption Treatment)

The weight of the obtained composite body was measured, and the weight of the metal (B) measured in advance was subtracted from the measured weight of the composite body to determine the weight of the thermoplastic resin (2a) before water absorbing. Then, the composite body was immersed in hot water of 80° C. for 50 hours. The weight of composite body was measured, and the weight of the metal (B) measured in advance was subtracted from the measured weight of the composite body to determine the weight of the thermoplastic resin (2a) after water absorption. The weight of the thermoplastic resin (2a) before water absorbing was subtracted from the thermoplastic resin (2a) after water absorption to determine the weight of the absorbed water. The percentage of the weight of the absorbed water to the weight of the thermoplastic resin (2a) after water absorption was calculated to confirm that it was 6-7 weight %. The composite body after immersion was placed in a multilayer pouch of polyethylene and aluminum, sealed, and kept at room temperature for 48 hours or more until just before bonding molding to the resin in order to uniformly diffuse the absorbed water in the thermoplastic resin composition (2A).

(Strength Measurements)

The metal portion of the composite body shown by 1 in the FIGURE was secured in an N735 vise made by ERON Corp. A 200 mm×150 mm×times×12 mm plate of SUS 304 was inserted into the resin portion from the opening side, and bending load was applied by the inserted metal plate in a section 0.2 m away from the hatched section 4 in the FIGURE, which is the interface of the resin and metal of the composite body, to bring about rupture of the composite body. The bending moment at the time of rupture was divided by the section modulus of the entire bonding face, to derive the bending strength. Specifically, the value was derived by the following equation (4).

$$\text{Bending strength (Pa)} = 0.2 \text{ (m)} \times \text{load at rupture } (N) / (0.15 \text{ (m)} \times 0.012 \text{ (m)} \times 0.012 \text{ (m)}/6) \quad (4)$$

Example 24

The prepared metal (B) was preheated in an SONW-450 natural convection dryer made by As One Corp., set to 200° C. The test piece was then positioned in a die for forming the composite body of the FIGURE, which was attached to an SE-100D injection molder made by Sumitomo Heavy Industries Co. Ltd. A polyamide resin composition of a mixture of 25 weight % of (X-1), 50 weight % of (X-2) and 25 weight % of (2A-1) was introduced into the injection molder, and injected into the die (at a die temperature of 140° C.) at a resin temperature of 290° C., and after 30 seconds at a holding pressure of 60 MPa, was cooled in the die for 45 seconds, to obtain a composite body of the shape in the FIGURE. Bonding strength of the obtained composite body is shown in Table 4.

Example 25

A composite body was obtained in the same manner as Example 24, except that (2A-2) was used instead of (2A-1). Bonding strength of the obtained composite body is shown in Table 4.

Example 26

A composite body was obtained in the same manner as Example 24, except that (2A-3) was used instead of (2A-1). Bonding strength of the obtained composite body is shown in Table 4.

Example 27

A composite body was obtained in the same manner as Example 24, except that (2A-4) was used instead of (2A-1). Bonding strength of the obtained composite body is shown in Table 4.

Comparative Example 4

A composite body was obtained in the same manner as Example 24, except that 50 weight % of (X-1) was used and (2A-1) was not used. Bonding strength of the obtained composite body is shown in Table 4.

Comparative Example 5

A composite body was obtained in the same manner as Example 24, except that only (X-1) was used. Bonding strength of the obtained composite body is shown in Table 4. The bonding strength at 7 weight % water absorption of the composite body is shown as 0 since the composite body is ruptured when SUS plate is inserted.

Example 28

A composite body was obtained in the same manner as Example 24, except for using 40 weight % of (X-1), 50 weight % of (X-2) and 10 weight % of (2A-1). Bonding strength of the obtained composite body is shown in Table 4.

Example 29

A composite body was obtained in the same manner as Example 24, except for using 35 weight % of (X-1), 50 weight % of (X-2) and 15 weight % of (2A-1). Bonding strength of the obtained composite body is shown in Table 4.

Example 30

A composite body was obtained in the same manner as Example 24, except for using 30 weight % of (X-1), 50 weight % of (X-2) and 20 weight % of (2A-1). Bonding strength of the obtained composite body is shown in Table 4.

Example 31

A composite body was obtained in the same manner as Example 24, except for using 20 weight % of (X-1), 50 weight % of (X-2) and 30 weight % of (2A-1). Bonding strength of the obtained composite body is shown in Table 4.

Example 32

A composite body was obtained in the same manner as Example 24, except for using 15 weight % of (X-1), 50 weight % of (X-2) and 35 weight % of (2A-1). Bonding strength of the obtained composite body is shown in Table 4.

Example 33

A composite body was obtained in the same manner as Example 24, except for no using (X-1), and using 50 weight % of (X-2) and 50 weight % of (2A-1). Bonding strength of the obtained composite body is shown in Table 4.

Example 34

A composite body was obtained in the same manner as Example 24, except for no using (X-2), and using 50 weight % of (X-1) and 50 weight % of (2A-1). Bonding strength of the obtained composite body is shown in Table 4.

Example 35

A composite body was obtained in the same manner as Example 24, except for using only (2A-1). Bonding strength of the obtained composite body is shown in Table 4.

Example 36

A composite body was obtained in the same manner as Example 24, except for using 45 weight % of (X-1), 50 weight % of (X-2) and 5 weight % of (2A-3). Bonding strength of the obtained composite body is shown in Table 4.

Example 37

A composite body was obtained in the same manner as Example 24, except for using 40 weight % of (X-1), 50 weight % of (X-2) and 10 weight % of (2A-3). Bonding strength of the obtained composite body is shown in Table 4.

Example 38

A composite body was obtained in the same manner as Example 24, except for using 35 weight % of (X-1), 50 weight % of (X-2) and 15 weight % of (2A-3). Bonding strength of the obtained composite body is shown in Table 4.

Example 39

A composite body was obtained in the same manner as Example 24, except for using 30 weight % of (X-1), 50 weight % of (X-2) and 20 weight % of (2A-3). Bonding strength of the obtained composite body is shown in Table 4.

Example 40

A composite body was obtained in the same manner as Example 24, except for using 20 weight % of (X-1), 50 weight % of (X-2) and 30 weight % of (2A-3). Bonding strength of the obtained composite body is shown in Table 4.

Example 41

A composite body was obtained in the same manner as Example 24, except for using 15 weight % of (X-1), 50 weight % of (X-2) and 35 weight % of (2A-3). Bonding strength of the obtained composite body is shown in Table 4.

Example 42

A composite body was obtained in the same manner as Example 24, except for no using (X-1), and using 50 weight % of (X-2) and 50 weight % of (2A-3). Bonding strength of the obtained composite body is shown in Table 4.

Example 43

A composite body was obtained in the same manner as Example 24, except for mixing the polyamide resin composition with 50 weight % of (2A-5) and 50 weight % of (X-4). Bonding strength of the obtained composite body is shown in Table 4.

Example 44

A composite body was obtained in the same manner as Example 43, except for no using (X-4), and using 100 weight % of (2A-5). Bonding strength of the obtained composite body is shown in Table 4.

Example 45

A composite body was obtained in the same manner as Example 43, except for no using (2A-5), and using 50 weight % of (2A-6). Bonding strength of the obtained composite body is shown in Table 4.

Example 46

A composite body was obtained in the same manner as Example 45, except for no using (X-4), and using 100 weight % of (2A-6). Bonding strength of the obtained composite body is shown in Table 4.

Comparative Example 6

A composite body was obtained in the same manner as Example 24, except for mixing the polyamide resin composition with 50 weight % of (X-3) and 50 weight % of (X-4). Bonding strength of the obtained composite body is shown in Table 4.

Comparative Example 7

A composite body was obtained in the same manner as Example 24, except for no using (X-3), and using 100 weight % of (X-4). Bonding strength of the obtained composite body is shown in Table 4.

TABLE 4

| | Thermoplastic Resin Composition | | | | | | Composite body | |
|---|---|---|---|---|---|---|---|---|
| | Water-absorbing thermoplastic resin | Metal hydroxide Magnesium hydroxide | | | Inorganic filler* | Glass | Strength of Composite Body | |
| | Polyamide 6 Amount (weight %) | Average Particle Size | Purity (%) | Surface-treated | Amount (weight %) | Talc Amount (weight %) | fiber Amount (weight %) | Initial MPa | 7 wt % water Absorption MPa |
| Example 24 | 55 | 3.4 | 96.6 | untreated | 5 | 10 | 30 | 28.7 | 17.8 |
| Example 25 | 55 | 3.4 | 97.3 | Untreated | 5 | 10 | 30 | 26.3 | 17.3 |
| Example 26 | 55 | 2.0 | 98.8 | Untreated | 5 | 10 | 30 | 26.2 | 17.7 |
| Example 27 | 55 | 1.9 | 98.8 | treated | 5 | 10 | 30 | 26.0 | 15.9 |
| Com. Ex.* 4 | 60 | — | — | — | 0 | 10 | 30 | 26.9 | 6.6 |
| Com. Ex.* 5 | 70 | — | — | — | 0 | 0 | 30 | 10.1 | 0 |
| Example 28 | 58 | 3.4 | 96.6 | untreated | 2 | 10 | 30 | 29.7 | 18.1 |
| Example 29 | 57 | 3.4 | 96.6 | Untreated | 3 | 10 | 30 | 29.0 | 19.0 |
| Example 30 | 56 | 3.4 | 96.6 | Untreated | 4 | 10 | 30 | 30.0 | 19.5 |
| Example 31 | 54 | 3.4 | 96.6 | untreated | 6 | 10 | 30 | 29.7 | 18.4 |
| Example 32 | 53 | 3.4 | 96.6 | Untreated | 7 | 10 | 30 | 28.6 | 18.8 |
| Example 33 | 50 | 3.4 | 96.6 | Untreated | 10 | 10 | 30 | 27.8 | 18.2 |
| Example 34 | 60 | 3.4 | 96.6 | Untreated | 10 | 0 | 30 | 26.9 | 12.1 |
| Example 35 | 50 | 3.4 | 96.6 | untreated | 20 | 0 | 30 | 18.9 | 13.0 |
| Example 36 | 59 | 2.0 | 98.8 | untreated | 1 | 10 | 30 | 25.8 | 14.4 |
| Example 37 | 58 | 2.0 | 98.8 | Untreated | 2 | 10 | 30 | 27.1 | 18.5 |
| Example 38 | 57 | 2.0 | 98.8 | Untreated | 3 | 10 | 30 | 28.7 | 18.8 |
| Example 39 | 56 | 2.0 | 98.8 | Untreated | 4 | 10 | 30 | 26.9 | 18.6 |
| Example 40 | 54 | 2.0 | 98.8 | Untreated | 6 | 10 | 30 | 26.5 | 17.9 |
| Example 41 | 53 | 2.0 | 98.8 | Untreated | 7 | 10 | 30 | 26.4 | 17.7 |
| Example 42 | 50 | 2.0 | 98.8 | Untreated | 10 | 10 | 30 | 25.7 | 17.1 |
| Example 43 | 90 | 3.4 | 96.6 | Untreated | 10 | 0 | 0 | 13.3 | 13.8 |
| Example 44 | 80 | 3.4 | 96.6 | Untreated | 20 | 0 | 0 | 11.4 | 11.0 |
| Example 45 | 90 | 2.0 | 98.8 | Untreated | 10 | 0 | 0 | 12.9 | 12.1 |
| Example 46 | 90 | 2.0 | 98.8 | Untreated | 20 | 0 | 0 | 10.9 | 11.9 |
| Com. Ex.* 6 | 90 | — | — | — | 0 | 10 | 0 | 16.1 | 0 |
| Com. Ex.* 7 | 80 | — | — | — | 0 | 20 | 0 | 19.7 | 5.8 |

Com. Ex.: Comparative Example
Inorganic filler*: Inorganic filler for raising by 3° C. or more the crystallization temperature

DESCRIPTION OF REFERENCES

1 metal (B)
2 thermoplastic resin
3 gate
4 (contact) bonding face metal (B) and resin (A)
5 sprue

The invention claimed is:

1. A composite body obtained by contact-bonding a thermoplastic resin (A) and a metal (B), wherein the thermoplastic resin (A) is a polyamide elastomer (1A) which has a polyamide unit as a hard segment and a polyether unit as a soft segment, the soft segment being an ABA type triblock polyether represented by the following Formula (1),

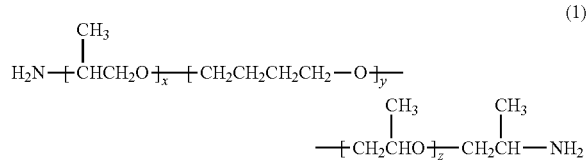

wherein x denotes 1 to 20, y denotes 4 to 50, and z denotes 1 to 20, and the metal (B) is a surface-treated metal or surface-untreated metal.

2. The composite body according to claim 1, wherein the polyamide elastomer (1A) is a polyamide elastomer composition containing a polyether amide elastomer and an inorganic filler (1b).

3. The composite body according to claim 2, wherein the inorganic filler (1b) is at least one member selected from the group consisting of silicate mineral, hydroxide, graphite, and metal oxide.

4. The composite body according to claim 3, wherein the inorganic filler (1b) is at least one member selected from the group consisting of talc, magnesium hydroxide, graphite, and magnesium oxide.

5. The composite body according to claim 2, wherein the inorganic filler (1b) is contained in the polyamide elastomer composition in an amount of 0.01 weight % to 50 weight %.

6. The composite body according to claim 2, wherein the polyamide elastomer composition contains an aminosilane coupling agent.

7. The composite body according to claim 6, wherein the aminosilane coupling agent is contained in the polyamide elastomer composition in an amount of 0.01 weight % to 1.0 weight %.

8. The composite body according to claim 1, wherein the thermoplastic resin (A) and the metal (B) are contact-bonded through injection molding.

9. The composite body according to claim 1, wherein the surface treatment is a treatment for fine uneven surface processing to the surface thereof such that the metal surface is covered by microscopic recesses or hole openings of number-average diameter of 10 to 100 nm, or fixing a chemical substance to the surface thereof.

* * * * *